United States Patent
Kofflin

[19]

[11] Patent Number: 5,915,654
[45] Date of Patent: Jun. 29, 1999

[54] PRE-CONDITIONED AIR CONNECTION RING

[76] Inventor: David Francis Kofflin, 7550-22nd Ave. So., Minneapolis, Minn. 55450

[21] Appl. No.: 08/939,965

[22] Filed: Sep. 29, 1997

[51] Int. Cl.⁶ .................................................... B64C 1/06
[52] U.S. Cl. ........................................ 244/131; 244/135 A
[58] Field of Search ................................. 244/131, 135 A

[56] References Cited

U.S. PATENT DOCUMENTS

| | | | |
|---|---|---|---|
| 4,508,404 | 4/1985 | Frawley | 244/135 A |
| 4,905,938 | 3/1990 | Braccio et al. | 244/135 A |
| 4,981,272 | 1/1991 | Cutore | 244/135 A |

*Primary Examiner*—J. Woodrow Eldred
*Attorney, Agent, or Firm*—Thomas B. Tate

[57] ABSTRACT

A pre-conditioned air connection ring designed to adapt the PCA connection port of an Airbus aircraft to the configuration which is standard in the industry. The connection ring includes a plurality of projections and slots which allow a standard pre-conditioned air adapter chute to be fitted onto an Airbus PCA connection port.

1 Claim, 1 Drawing Sheet

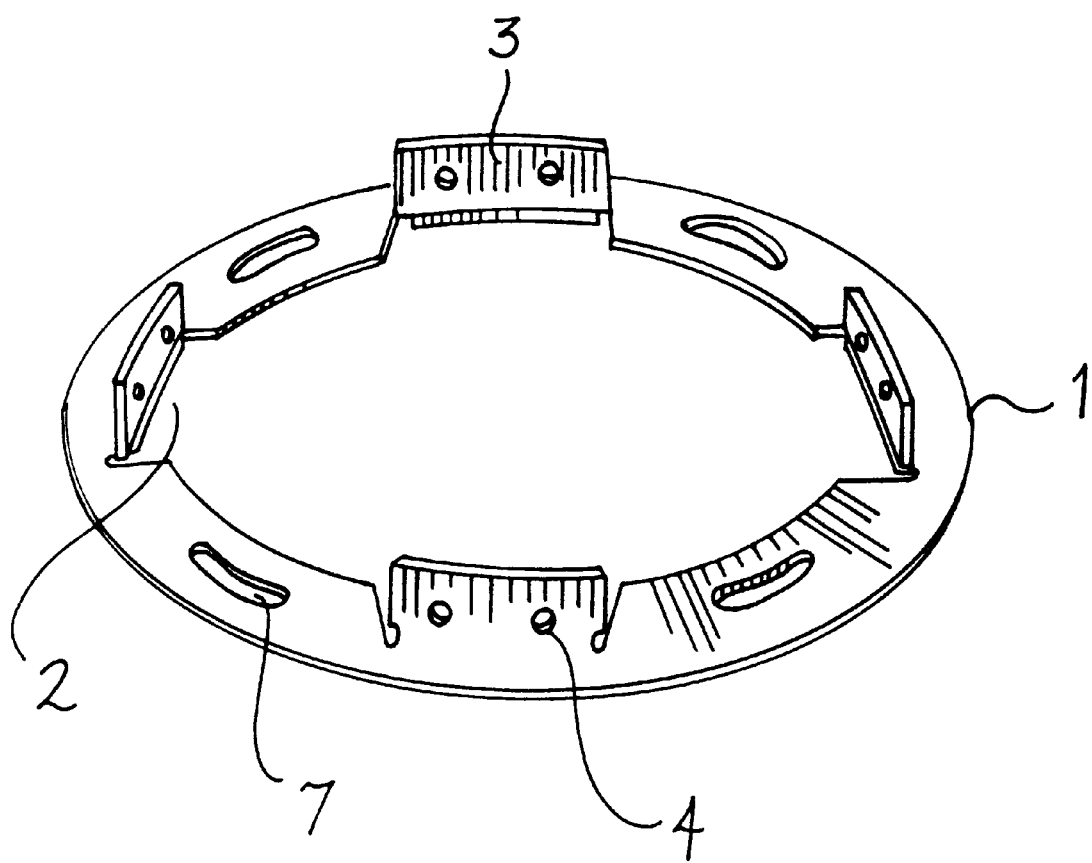

PRE-CONDITIONED AIR CONNECTION RING

SUMMARY AND BACKGROUND OF THE INVENTION

In order to supply pre-conditioned air into an aircraft, a pre-conditioned air adapter chute is connected at its bottom end to a pre-conditioned air unit on the ground and at its top end to a connection port on the aircraft being serviced. All American-made aircraft have a connection port which has slots into which the hooks of the adapter chute can be inserted to hold the chute securely in position while the aircraft is being serviced. This is the industry standard for both civilian and military aircraft.

However, the French-made AIRBUS aircraft has a connection port which is a tube which has pegs or ledges instead of slots. As a result, this aircraft is difficult to service because the hooks of the adapter chute must be clamped onto the ledges of the connection port.

The object of the invention is to avoid this problem by providing a connection ring which fits into and over the connection port, thereby providing the slots which the AIRBUS aircraft. Therefore, the hooks of the adapter eats can be inserted into the slots of the connector ring so that the chute fits precisely, thus allowing this type of aircraft to be serviced easily with standard equipment.

DESCRIPTION OF THE DRAWING

The FIGURE is a top perspective view.

DESCRIPTION OF THE PREFERRED EMBODIMENT OF THE INVENTION

The invention is a pre-conditioned air connection ring or adapter plate designed to fit into and over the connection port of an aircraft having a connection port which is a tube with ledges but no slots in order to convert this type of connection port to a standard configuration and thus allow a conventional pre-conditioned air adapter chute to be attached thereto.

The connection ring has a generally circular ring structure 1 which is made of metal, preferably heat-treated aluminum of aircraft quality. Recesses 2 are formed into the ring 1 at four positions equidistant on the interior perimeter of ring 1, for example, at the twelve o'clock, three o'clock, six o'clock, and nine o'clock positions. At the back end of each recess 2, a projection 3 extends upward from the ring 1. Each projection 3 is curved to follow the contour of the ring 1, and is provided with two belt holes 4. Four slots 7 are formed into the ring 1, each slat 7 being positioned between two projections 3.

The connection port on the AIRBUS aircraft is a tube with ledges. In order to use the invention, the ring 1 is fit into the tube and the belts normally present in the tube are removed. The projections 3 on the ring 1 are screwed onto the tube by inserting screws through the belt holes 4 of the ring 1 and the belt holes in the tube. The hooks of the pre-conditioned air adapter chute are then fitted into the slots 7 in order to service the aircraft.

I claim:

1. A pre-conditioned air connection ring for an aircraft having a connection port which is a tube with ledges but no slots, said connection ring fitting into and over said connection port, said connection ring comprising:

a generally circular ring structure;

a plurality of projections extending upwardly from said ring structure at positions approximately equidistant from one another, each of said projections having holes formed therethrough;

a plurality of slots formed into said ring structure, each of said slots being positioned between two of said projections.

* * * * *